United States Patent [19]

Yamaguchi et al.

[11] Patent Number: 4,499,121
[45] Date of Patent: Feb. 12, 1985

[54] METHOD OF PREPARING A MAGNETIC RECORDING MEDIUM WITH A CALENDERING TREATMENT

[75] Inventors: Nobutaka Yamaguchi; Masaaki Fujiyama; Sugihiko Tada; Eiichi Tadokoro; Katsumi Ryoke; Masahiro Utsumi; Masami Suzuki, all of Kanagawa, Japan

[73] Assignee: Fuji Photo Film Co., Ltd., Kanagawa, Japan

[21] Appl. No.: 491,485

[22] Filed: May 4, 1983

[30] Foreign Application Priority Data

May 4, 1982 [JP] Japan .................................. 57-75634

[51] Int. Cl.³ .............................................. H01F 10/02
[52] U.S. Cl. ..................................... 427/130; 427/128
[58] Field of Search ............................... 427/127-132, 427/48

[56] References Cited

U.S. PATENT DOCUMENTS 3,398,011 8/1968 Neirotte et al. ..................... 427/130

Primary Examiner—Bernard D. Pianalto
Attorney, Agent, or Firm—Sughrue, Mion, Zinn, Macpeak and Seas

[57] ABSTRACT

A method for producing a magnetic recording medium is disclosed. The method involves providing a ferromagnetic coating layer on a non-magnetic support base to produce a coated base. The coated base is then subjected to an atmosphere having a RH of 60% or more, prior to or during a subsequent calendering treatment. The recording medium produced has excellent surface smoothness and improved electromagnetic properties. The method is advantageous in that a substantially long period of time may pass between the coating of the ferromagnetic layer on the support and the calendering treatment without having undesirable effects on the magnetic recording medium produced.

6 Claims, 7 Drawing Figures

METHOD OF PREPARING A MAGNETIC RECORDING MEDIUM WITH A CALENDERING TREATMENT

FIELD OF THE INVENTION

This invention relates to a method for preparing a magnetic recording medium, and more particularly to a calender treatment for a magnetic layer.

BACKGROUND OF THE INVENTION

Various means have been used to smooth the surface of a magnetic layer of a coated type magnetic recording tape. Generally, calendering treatment is carried out to smooth the coated surface after a magnetic layer is provided on a non-magnetic support in a method for preparing a coated type magnetic recording tape. However, sufficient surface smoothness has not been attained to provide high density recording.

SUMMARY OF THE INVENTION

An object of the invention is to provide a magnetic recording medium having excellent surface smoothness.

Another object of the invention is to provide a magnetic recording medium having an improved electromagnetic property.

The present inventors have unexpectedly found that improved results can be obtained by changing the conditions for calender treatment and have attained this invention.

That is, the objects of the invention can be achieved by a magnetic recording medium which is prepared by providing a magnetic layer on a non-magnetic support and passing the magnetic layer through a humid zone at not lower than 60% RH before or during a calender treatment. By utilizing the method of the present invention a relatively long period of time may pass between the placement of the ferromagnetic layer on the support base and the calendering treatment without having undesirable effects such as deteriorations in electromagnetic properties and surface properties on the recording medium produced. Further the resulting recording medium can be regularly wound in a roll form such that the edges are aligned in a single plane. Therefore a subsequent step (e.g., a slitting step) can be carried out with ease.

DETAILED DESCRIPTION OF PREFERRED EMBODIMENTS

An apparatus for calender treatment is a commonly used apparatus and an example is disclosed in Japanese Patent Publication Nos. 14390/65, 37523/76, 17404/77, Japanese Patent Application (OPI) Nos. 103404/76, 12405/78, 46264/79, 111308/79 and U.S. Pat. No. 4,128,053 (incorporated herein by reference to disclose such a device).

FIGS. 1 to 6 are diagrams showing an apparatus used for carrying out the method of the invention.

Figure 6:
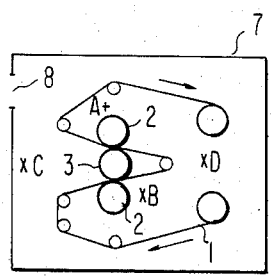
FIG. 6 is a schematic view showing the calendering treatment of the present invention being carried out while the coated base is being subjected to an atmosphere having a RH of not less than 60%.
Figure 7:
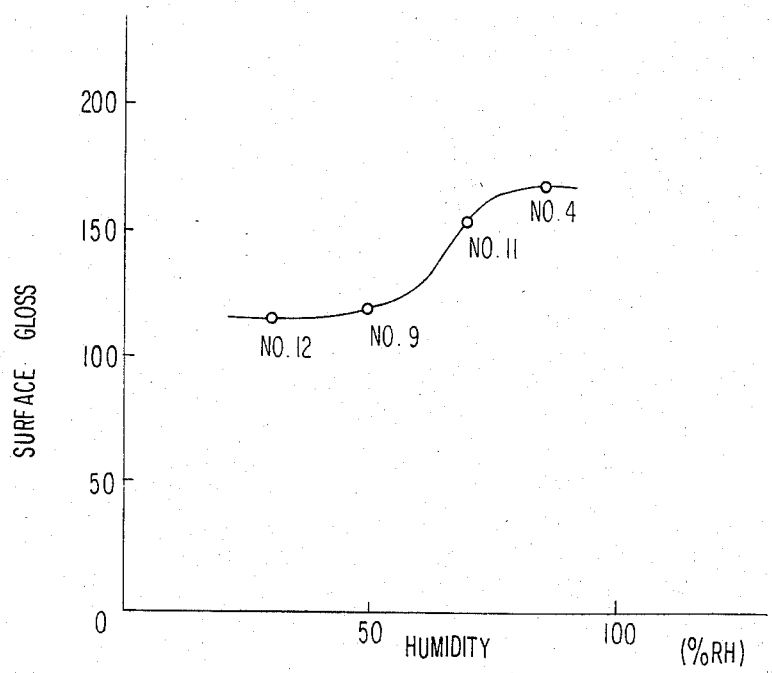
FIG. 7 is a graph showing the relationship between the humidity during the calendering treatment and the surface gloss.

In FIGS. 1 to 4, a magnetic recording medium 1 which is prepared by coating a magnetic layer on a support is guided to sections for calendering treatment. The sections which carry out the calender treatment are mainly composed of a combination of two or more rolls selected from a metal roll 2, a fiber roll 3 and a plastic roll 4 with or without an elastic belt 5 or an elastic roll 6. In FIG. 6, an apparatus for calendering treatment is provided in a room comprised of polyethylene terephthalate 7 having an inlet 8 therein for introducing steam. The inlet 8 is provided in an upper areas of the room.

When calendering treatment is carried out using the above apparatus, a magnetic layer passes through a humid zone at 60 %RH or more, preferably not less than 70% RH and more preferably not lower than 85 %RH. The term "humid zone" as used herein means an area having a RH of 60% or more to which the magnetic layer is exposed and treated before it is introduced into an apparatus for calendering treatment or such an area in an apparatus for calendering treatment. More specifically, the magnetic layer provided on a support must be in a humid condition when it is subjected to calendering treatment. Therefore, it is important for the magnetic layer to be placed under a humid condition at not lower than 60 %RH and preferably not lower than 70 %RH before or during the time when the magnetic layer is subjected to calendering treatment.

The temperature at which the calendering treatment is carried out is a commonly used temperature, preferably 5° to 40° C. and more preferably 10° to 35° C.

The temperature of the metal roll for the calender is preferably 30° to 120° C. and more preferably 50° to 100° C.

The pressure between the calendering rolls is preferably 50 to 500 kg/cm of linear pressure.

Elastic rolls used for calendering include a fiber roll such as a cotton roll or a fil mat roll; a plastic roll such as a nylon roll or an epoxy roll; a rubber roll and rolls which can be used for preparing a magnetic recording tape. The composition of the material is not particularly limited and conventional elastic rolls can be used. Further, carbon black or body (extender pigment, e.g., $CaCO_2$ and talc) may be added to the elastic roll, if desired.

Methods for heating the metal roll include a hot water heating method and a heat transfer roll method, with the latter method being preferred. The method used is not particularly limited in the invention.

The non-magnetic support provided with a magnetic layer may be a support such as those commonly used for a magnetic recording medium such as polyethylene terephthalate, triacetylcellulose, polyethylene naphthalate, polyamide or polyimide, as well as a plastic film having aluminum evaporated thereon, or a plastic film coated with a backing layer containing carbon black, a fine extender pigment and a binder or a dual surface film. Of these, polyethylene terephthalate is particularly preferred in view of strength, chemical resistance, stability and cost. The thickness of support is generally 3 to 100μ and preferably 5 to 30μ.

Useful ferromagnetic particles for the magnetic layer include $\gamma\text{-}Fe_2O_3$, $Fe_3O_4$, $FeOx$ ($1.5 \leq X \leq 1.33$), cobalt-containing $\gamma\text{-}Fe_2O_3$, cobalt-containing $FeOx$, $CrO_2$, an alloy powder such as Fe-Ni or Fe-Ni-Co. The alloy powder which is subjected to surface treatment for the purpose of an anti-corrosion treatment is particularly preferred.

Useful binders includes those as commonly used for a magnetic recording medium such as polyvinyl chloride, a copolymer of vinyl chloride-vinyl acetate, a copolymer of vinyl chloride-vinyl acetate having a carboxyl group, a copolymer of vinyl chloride-vinyl acetate containing vinyl alcohol, polyvinylidene chloride, a copolymer of vinylidene chloride-acrylonitrile, a cellulose derivative such as nitrocellulose, acrylonitrile-butadiene rubber, styrene-butadiene rubber, polyester, epoxy resin polyisocyanate or polyamide. Copolymers of vinyl chloride-vinyl acetate having a carboxyl group or containing vinyl alcohol, nitrocellulose and polyisocyanate are preferably used in connection with the present invention.

The binder is generally used in an amount of 3 to 100 parts by weight, preferably 5 to 80 parts by weight, more preferably 10 to 50 parts by weight, per 100 parts by weight of ferromagnetic particles.

Useful lubricants include paraffin, fluid paraffin, fatty acids such as oleic acid or stearic acid, fatty acid esters such as butyl stearate or ethyl stearate, silicone oil, fatty acid modified silicone, fluorine type oils such as CRYTOX or Difloil and solid lubricants such as ketone wax, graphite or $MoS_2$. Of these, fatty acids, fatty acid esters and silicone oil are preferred. The lubricant can be added in a magnetic layer in an amount of 0.05 to 30 parts by weight, preferably 0.5 to 10 parts by weight, more preferably 0.5 to 5 parts by weight, per 100 parts by weight of ferromagnetic particles.

If necessary, a plasticizer such as DBP or TPP, a dispersing agent such as lecitin or Tenlo, an abrasive such as $Cr_2O_3$, alumina, SiC or α-iron oxide and an antistatic agent such as carbon black can be added to a magnetic layer to obtain good properties. The abrasive and the antistatic agent can be added in a magnetic layer within the ranges of 0.1 to 30 (preferably 1 to 5) parts by weight and 0.1 to 30 (preferably 2 to 20) parts by weight, respectively, per 100 parts by weight of ferromagnetic particles.

The magnetic layer is provided on a non-magnetic support in a conventional manner. The thickness of magnetic layer is generally from 1 to 10μ, and preferably from 3 to 8μ.

The invention will be explained in more detail by the following examples. However, the invention is not limited to those examples. In the examples and comparative examples, "part" means "part by weight".

EXAMPLE 1

|  | Parts |
| --- | --- |
| Ferromagnetic particles (Co-containing | 100 |
| γ-$Fe_2O_3$, Hc: 660 Oe, longer axis: 0.4μ) | |
| Nitrocellulose | 8 |
| Polyurethane resin | 3 |
| Polyisocyanate | 3 |
| Silicone oil | 0.5 |
| Carbon black | 7 |
| $Cr_2O_3$ | 2.5 |
| Solvent (n-butyl acetate/toluene = 7/3) | 300 |

Figure 1:
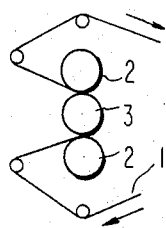
FIGS. 1, 2, 3, 4, and 5 are schematic views showing different calendering treatments used in connection with the present invention.
Figure 2:
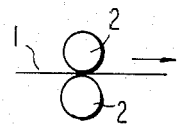
Figure 3:
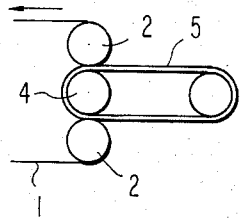
Figure 4:
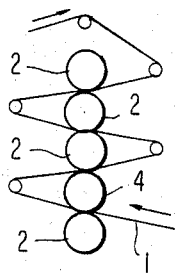
Figure 5:
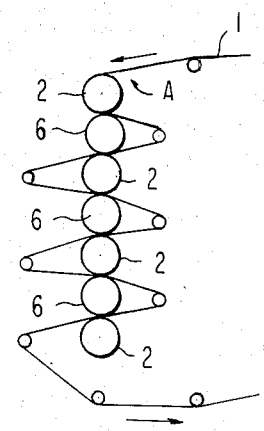

The above compositions (parts by solid content) were mixed in a ball mill to prepare a coating composition, which was coated on a polyethylene terephthalate film having a thickness of 15μ. The wound roll was subjected to a calender treatment in a calender room by an apparatus as shown in FIG. 5 at 20° C., 50 %RH. In FIG. 5, the temperature and the humidity were 20° C. and 85 %RH at point A.

The metal roll was heated to 70° C., and travelled at a speed of 60 m/min. and the linear pressure between the lowermost metal roll 2 and an elastic roll 6 was 290 kg/cm.

The tape was partially humidified by an ultrasonic humidifier directly before calendering treatment.

The passage of time between the coating of the magnetic composition and when the magnetic tape was subjected to calender treatment was 0.5, 1, 10, 24 and 72 hours. Each tape was slit to a width of ½ inch to prepare a VHS type video cassette Sample Nos. 1, 2, 3, 4 and 5.

COMPARATIVE EXAMPLE 1

The same procedure as in Example 1 was repeated to prepare Sample Nos. 6, 7, 8, 9 and 10 with the passage of 0.5, 1, 10, 24 and 72 hours between the coating of the magnetic layer and the calender treatment except that each tape was not partially humidified by an ultrasonic humidifier and, the humid zone was adjusted to 50 %RH at 20° C.

EXAMPLE 2

The same procedure as in Example 1 was repeated to prepare Sample No. 11 with the passage of 24 hours between the coating of the magnetic layer and the calender treatment except that the humidity at point A in FIG. 5 was 70 %RH.

COMPARATIVE EXAMPLE 2

The same procedure as in Example 1 was repeated to prepare Sample No. 12 with the passage of 24 hours between the coating of the magnetic layer and the calender treatment except that the humidity at point A in FIG. 5 was 30 %RH.

The results of evaluations of Sample No. 1 to 12 are shown in Table 1.

TABLE 1

| Sample No. | Example or Comparative Example | Passage of time (hrs.) | Temp. and Humidity | Surface gloss | Video sensitivity (dB) | Video S/N (dB) | Dropout (occurrence/min.) |
| --- | --- | --- | --- | --- | --- | --- | --- |
| 1 | Example 1 | 0.5 | 20° C., 85% RH | 170 | 0 | 0 | 3 |
| 2 | " | 1 | " | 170 | 0 | 0 | 3 |
| 3 | " | 10 | " | 170 | 0 | 0 | 4 |
| 4 | " | 24 | " | 169 | −0.1 | 0 | 2 |
| 5 | " | 72 | " | 165 | −0.3 | −0.1 | 2 |
| 6 | Comparative Example 1 | 0.5 | 20° C., 50% RH | 165 | −0.9 | −0.6 | 8 |
| 7 | Comparative | 1 | " | 160 | −1.3 | −0.7 | 13 |

TABLE 1-continued

| Sample No. | Example or Comparative Example | Passage of time (hrs.) | Temp. and Humidity | Surface gloss | Video sensitivity (dB) | Video S/N (dB) | Dropout (occur- rence/min.) |
| --- | --- | --- | --- | --- | --- | --- | --- |
| 8 | Comparative Example 1 | 10 | " | 138 | −1.8 | −1.6 | 11 |
| 9 | Comparative Example 1 | 24 | " | 120 | −2.5 | −2.1 | 15 |
| 10 | Comparative Example 1 | 72 | 41 | 90 | −4.0 | −3.5 | 10 |
| 11 | Example 2 | 24 | 20° C., 70% RH | 155 | −0.3 | −0.3 | 5 |
| 12 | Comparative Example 2 | 24 | 20° C., 30% RH | 115 | −3.0 | −3.2 | 100< |

With the passage of longer periods of time between the coating step of magnetic layer and the calender treatment, the surface gloss, video sensitivities and video S/N of the comparative samples Nos. 6 to 10 decreased, but those of samples Nos. 1 to 5 of Example 1 did not decrease. Sample No. 12 which was subjected to calender treatment at an extremely low humidity showed low surface gloss, video sensitivities, and video S/N and frequent dropout. The dropout was caused by the dust attached to the tape.

Samples Nos. 1 to 5 and 11 ran with less zigzag movement as compared to samples Nos. 6 to 10 during calender treatment. Accordingly, the wound shape of samples Nos. 1 to 5 and 11 after the calender treatment was good and the edges was aligned in a single plane. Since the wound shape of sample No. 12 was bad, sample No. 12 had to be rewound by an winding apparatus at a low rate of 2 m/sec. to have sample No. 12 slit in the next step.

It was clear from samples Nos. 1 to 12 that at the humidity of 60 %RH, good results can be obtained.

It is extremely advantageous to have a process for manufacturing a magnetic recording medium wherein the characteristics of the medium do not depend upon the passage of time between the coating step of the magnetic coating composition and the calender treatment. In the near future, tapes with longer durability will be in more and more demand and there will be a tendency to increase the amount of hardening agent to prepare a harder binder composition.

This invention is remarkably significant in view of the above advantages. The invention is believed to be effective because a small amount of water is attached to the magnetic recording medium immediately before the calender treatment which acts as a plasticizer during the calender treatment to improve the formation of the coated layer.

Three days after the calender treatment, a roll which was subjected to calender treatment was slit to a width of ½ inch and the magnetic layers of samples Nos. 4 and 9 were tested with respect to their solvent resistance using methyl ethyl ketone. It was found that sample No. 4 of the invention showed remarkably better solvent resistance than the sample No. 9. Water in a humid zone is believed to contributed to hardening of the polyisocyanate hardening agent.

EXAMPLE 3

|  | Parts |
| --- | --- |
| Ferromagnetic particles (Fe—Ni alloy powder, Fe/Ni = 9/1, Hc:1250 Oe, longer axis:0.3μ) | 100 |
| Vinyl chloride-vinyl acetate copolymer | 6 |
| Nitrocellulose | 3 |
| Nitrilbutadiene rubber | 1 |
| α-Al$_2$O$_3$ | 3 |
| Polyisocyanate | 9 |
| Lecitin | 0.5 |
| Oleic acid | 1 |
| Solvent (methyl ethyl ketone/cyclohexanone = 4/6) | 350 |

The above composition was dispersed with a sand-grinder to prepare a magnetic coating composition, which was then coated on a polyethylene terephthalate film having a thickness of 15μ. The magnetic layer was subjected to calendering treatment with a calendering apparatus as shown in FIG. 6 to prepare a magnetic tape having a width of ½ inch.

The calendering apparatus was covered with a polyethylene terephthalate film so as to make the volume of the humid zone small. Steam was then introduced to the zone as shown in FIG. 6 so as to make the humid zone homogeniously humid. The temperature of the humid zone was 18° C. before humidification and reached 28° C. during the calendering treatment.

The humidity at points A, B, C and D in the humid zone was about 95 %RH and nearly, 100 %RH.

The temperature of the metal roll was adjusted to 85° C., the travelling speed was 40 m/min. with a linear pressure of 360 kg/cm. The calender treatment was conducted 3 times. The samples Nos. 13 to 17 were prepared with the passage of 0.5, 1, 10, 24 and 72 hours between the coating of the magnetic layer and the calender treatment.

COMPARATIVE EXAMPLE 3

The same procedure as in Example 3 was repeated except that the temperature and the humidity at points A, B, C and D in FIG. 6 were 28° C. and 50 %RH to prepare samples Nos. 18 to 22 with the passage of 0.5, 1, 10, 24 and 72 hours between the coating of the magnetic layer and the calender treatment.

The results of samples Nos. 13 to 17 and 18 to 22 are shown in Table 2.

TABLE 2

| Sample No. | Example or Comparative Example | Passage of time (hrs.) | Temp. and Humidity | Surface gloss | Video sensitivity (dB) | Video S/N (dB) | Dropout (occur- rence/min.) |
| --- | --- | --- | --- | --- | --- | --- | --- |
| 13 | Example 3 | 0.5 | 28° C., 95% RH | 220 | 0 | 0 | 15 |

TABLE 2-continued

| Sample No. | Example or Comparative Example | Passage of time (hrs.) | Temp. and Humidity | Surface gloss | Video sensitivity (dB) | Video S/N (dB) | Dropout (occurrence/min.) |
| --- | --- | --- | --- | --- | --- | --- | --- |
| 14 | " | 1 | " | 218 | 0 | 0 | 13 |
| 15 | " | 10 | " | 215 | −0.1 | −0.1 | 15 |
| 16 | " | 24 | " | 210 | −0.3 | −0.5 | 9 |
| 17 | " | 72 | " | 205 | −0.7 | −1.0 | 14 |
| 18 | Comparative Example 3 | 0.5 | 28° C., 50% RH | 180 | −1.0 | −1.0 | 55 |
| 19 | Comparative Example 3 | 1 | " | 150 | −2.0 | −2.0 | 60 |
| 20 | Comparative Example 3 | 10 | " | 120 | −3.0 | −4.0 | 45 |
| 21 | Comparative Example 3 | 24 | " | 100 | −4.5 | −5.0 | 70 |
| 22 | Comparative Example 3 | 72 | " | 70 | −8.0 | −8.0 | — |

The same results as in the comparison of samples Nos. 1 to 5 and 6 to 10 were obtained where samples Nos. 13 to 17 and 18 to 22 were compared. In these examples, changes in humidity largely influenced the characteristics of the magnetic recording medium.

COMPARATIVE EXAMPLE 4

The same procedure used to prepare the magnetic recording tape of sample No. 9 in Comparative Example 1 was repeated. After the calender treatment was finished, the wound bulk roll was put in a humid zone at 50° C., 50 %RH for 48 hours, and slit to a width of ½ inch to prepare a video tape of sample No. 23.

The results comparing samples Nos. 4, 9 and 23 are shown in Table 3.

Surface gloss is the gloss of the surface of the magnetic recording layer which is measured by a gloss meter manufactured by Suga Tester Co., Ltd.

Dropout:

Dropout is a naked eye-measured dropout of more than ⅓ H where a gray scale signal is recorded and reproduced on a monitor.

Skew:

Skew is the skew distortion per cm which is converted by the dimensional change (%). The skew distortion is measured on a 19 inch TV which has reproduced thereon a signal which is recorded on a video tape and which is subjected to thermal treatment for 7 days at 50° C. and 30 %RH.

While the invention has been described in detail and

TABLE 3

| Sample No. | Example or Comparative Example | Passage of time (hrs.) | Temp. and Humidity | Surface gloss | Video sensitivity (dB) | Video S/N (dB) | Dropout (occurrence/min.) | Skew distortion (%) |
| --- | --- | --- | --- | --- | --- | --- | --- | --- |
| 9 | Comparative Example 1 | 24 | 20° C., 50% RH | 120 | −2.5 | −2.1 | 15 | 0.018 |
| 23 | Comparative Example 1 Example 4 | " | " (heat treatment after calendering) | 120 | −2.5 | −2.1 | 14 | 0.005 |
| 4 | Example 1 | " | 20° C., 85% RH | 169 | −0.1 | 0 | 0 | 0.018 |

Sample No. 9 is a comparative sample where the heat shrinkage was removed and the distortion caused by skew was improved. Sample No. 9 was prepared in accordance with the disclosure of Japanese Patent Publication No. 29501/80. When compared with sample No. 4 of the invention, sample No. 9 was inferior in surface smoothness, video sensitivity and video S/N.

Measurements of the magnetic recording media were carried out by the following methods.

Video Sensitivity:

Video sensitivity is the reproducing output at 4 MHz using a VHS type VTR ("NV-8800" manufactured by Matsushita Electric Co., Ltd.) as compared with a reference tape. Where the magnetic recording medium utilizing a metal alloy is used, the reproducing output at 5 MHz is compared with a reference tape by using a VTR of which the recording and reproducing magnetic head is changed by a sendust head.

Video S/N ratio:

Video S/N is a S/N at 10 KHz to 4 MHz which is obtained by correction of visible sensitivity.

Surface gloss:

Surface gloss:

with reference to specific embodiment thereof, it will be apparent to one skilled in the art that various changes and modifications can be made therein without departing from the spirit and scope thereof.

What is claimed is:

1. A method for producing a magnetic recording medium comprising the steps of:
    (A) providing a ferromagnetic coating layer on a non-magnetic support base to provide a coated base;
    (B) subjecting the coated base to an atmosphere having an RH of not less than 60% prior to step (C); and
    (C) subjecting the coated base to calendaring treatment.
2. A method for producing a magnetic recording medium as claimed in claim 1, wherein the atmosphere has a RH of not less than 70%.
3. A method for producing a magnetic recording medium as claimed in claim 2, wherein the atmosphere has a RH of not less than 85%.
4. A method for producing a magnetic recording medium as claimed in claim 1, wherein the calendering treatment is carried out at a temperature within the range of 5° to 40° C.

5. A method for producing a magnetic recording medium as claimed in claim 4, wherein the calendering treatment is carried out at a temperature within the range of 10° to 35° C.

6. A method for producing a magnetic recording medium as claimed in claim 1, wherein the calendering is carried out using a metal role having a temperature within the range of 30° to 120° C. using a linear pressure within the range of 50 to 500 Kg/cm.

* * * * *